United States Patent
Lanzoni et al.

(10) Patent No.: US 9,110,664 B2
(45) Date of Patent: Aug. 18, 2015

(54) SECONDARY GRAPHICS PROCESSOR CONTROL SYSTEM

(75) Inventors: Thomas P. Lanzoni, Cedar Park, TX (US); Ajay Kwatra, Austin, TX (US); Randall E. Juenger, Belton, TX (US)

(73) Assignee: Dell Products L.P., Round Rock, TX (US)

( * ) Notice: Subject to any disclaimer, the term of this patent is extended or adjusted under 35 U.S.C. 154(b) by 426 days.

(21) Appl. No.: 13/452,181

(22) Filed: Apr. 20, 2012

(65) Prior Publication Data

US 2013/0278613 A1    Oct. 24, 2013

(51) Int. Cl.
*G06F 15/16*    (2006.01)
*G06F 1/32*    (2006.01)
*G06F 9/50*    (2006.01)

(52) U.S. Cl.
CPC ............ *G06F 1/3218* (2013.01); *G06F 1/3212* (2013.01); *G06F 9/5094* (2013.01); *G06F 1/3265* (2013.01); *Y02B 60/1242* (2013.01); *Y02B 60/1292* (2013.01); *Y02B 60/142* (2013.01)

(58) Field of Classification Search
USPC ......................................................... 345/502
See application file for complete search history.

(56) References Cited

U.S. PATENT DOCUMENTS

| | | | |
|---|---|---|---|
| 7,721,118 B1* | 5/2010 | Tamasi et al. | 713/300 |
| 2012/0274641 A1* | 11/2012 | Diard | 345/428 |
| 2013/0117595 A1* | 5/2013 | Murawski et al. | 713/340 |
| 2014/0052965 A1* | 2/2014 | Sarel | 712/214 |

* cited by examiner

*Primary Examiner* — Mark Zimmerman
*Assistant Examiner* — Vu Nguyen
(74) *Attorney, Agent, or Firm* — Haynes and Boone, LLP

(57) ABSTRACT

A secondary graphics processor control system includes a secondary graphics processor. A controller is coupled to the secondary graphics processor. The controller detects the start of an application that is associated with a secondary graphics processor and then determines a power capability of a battery. The controller then either prevents enablement of the secondary graphics processor if the power capability is below a predetermined threshold such that only a primary graphics processor processes graphics for the application, or allows enablement of the secondary graphics processor if the power capability is above the predetermined threshold such that the secondary graphics processor processing graphics for the application. The primary graphics processor may be an integrated graphics processing unit (iGPU) provided by a system processor that is mounted to a board, and the secondary graphics processor may be a discrete graphics processing unit (dGPU) that is coupled to the board.

17 Claims, 4 Drawing Sheets

SECONDARY GRAPHICS PROCESSOR CONTROL SYSTEM

BACKGROUND

The present disclosure relates generally to information handling systems (IHSs), and more particularly to a secondary graphics processor control system in an IHS.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHSs utilize multiple graphics processors for processing graphics that are displayed on the IHS. For example, IHSs may include a system processor that provides a primary graphics processor, sometimes referred to as an integrated graphics processing unit (iGPU), along with a secondary graphics processor that is separate from the system processor/primary graphics processor, sometimes referred to as a discrete graphics processing unit (dGPU). The IHS may use only the primary graphics processor to process graphics when relatively less graphics intensive applications (e.g., email applications, productivity applications, web browsing applications, and/or a variety of other relatively less graphics intensive applications known in the art) are run on the IHS, and may use the secondary graphics processor to process graphics when more graphics intensive applications (e.g., gaming applications) are run on the IHS. Switching between processing graphics using the primary graphics processor and processing graphics using the secondary graphics processor has conventionally been performed using a switching algorithm that includes a list of applications that, upon launch, will result in the enablement of the secondary graphics processor for processing graphics for the IHS. If an application is launched that is not on the list of applications, the primary GPU will continue to process graphics for the IHS.

Enabling the secondary graphics processor in response to simply detecting the launch of an application on the list raises a number of issues. For example, the secondary graphics processor typically consumes much more power relative to the primary graphics processor, and automatically switching from the primary graphics processor to the secondary graphics processor to process graphics for the IHS may quickly deplete the IHS battery. This can result in a negative user experience when only IHS battery power is available to the IHS and a convenient power source with which to recharge the IHS battery is not available.

Accordingly, it would be desirable to provide an improved secondary graphics processor control system.

SUMMARY

According to one embodiment, a secondary graphics processor control system includes a secondary graphics processor and a controller coupled to the secondary graphics processor, wherein the controller is operable to: detect the start of an application that is associated with the secondary graphics processor; determine a power capability of a battery in response to detecting the start of the application; in response to the power capability of the battery being above a predetermined threshold, allow enablement of the secondary graphics processor for processing graphics for the application; and in response to the power capability of the battery being below the predetermined threshold, prevent enablement of the secondary graphics processor for processing graphics for the application.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
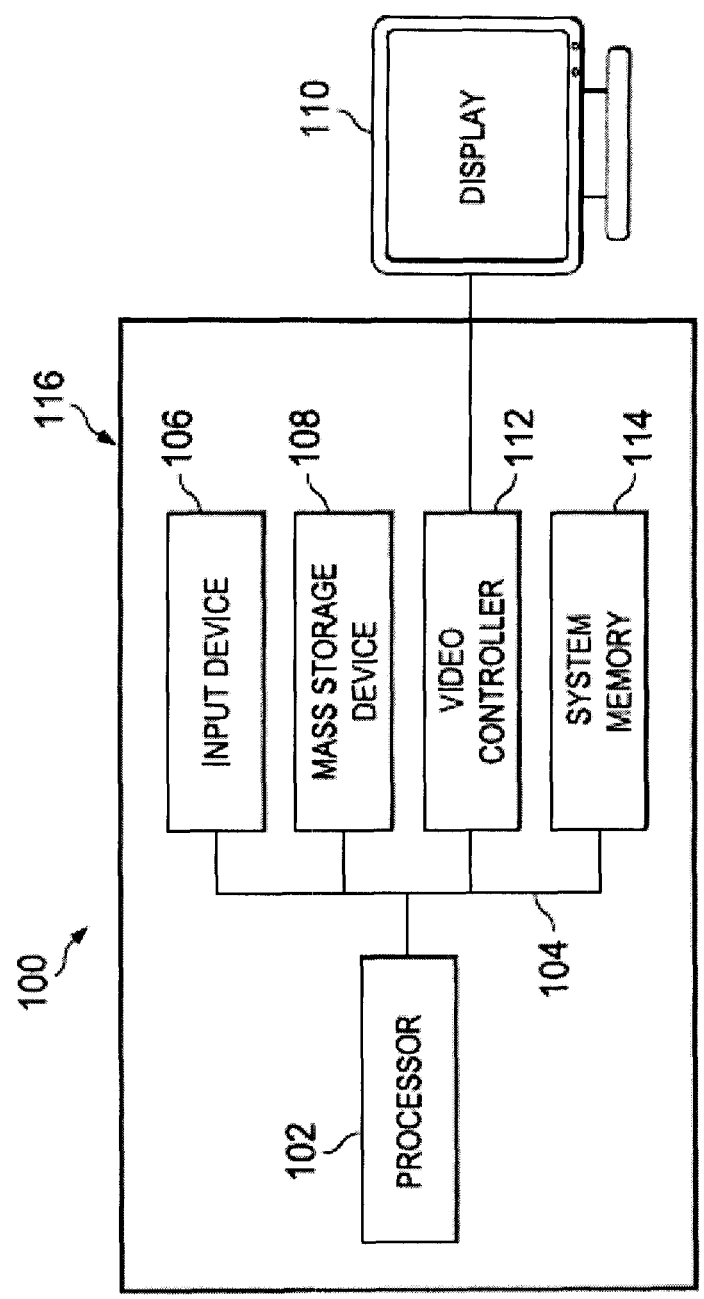
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
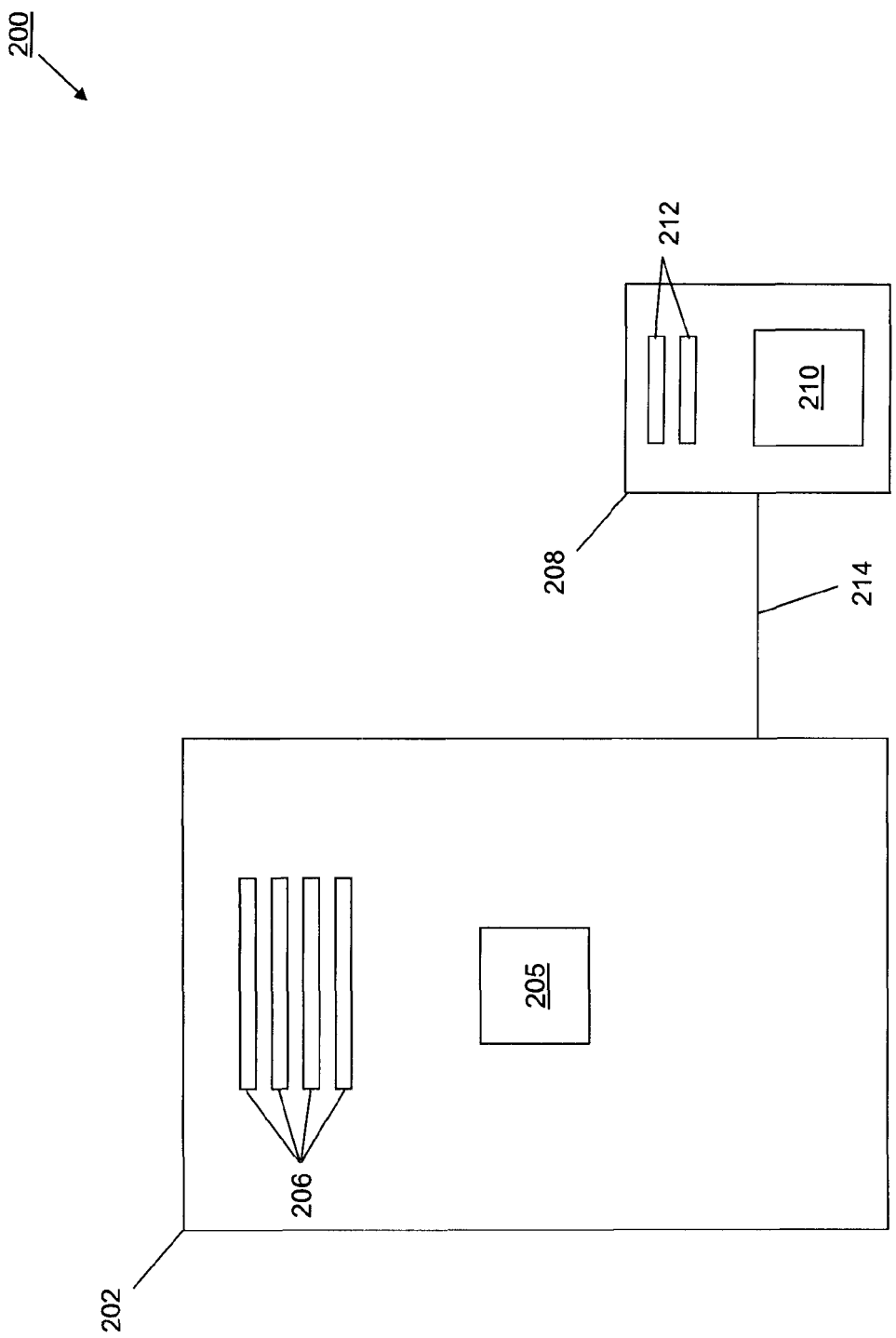
FIG. 2 is a schematic view illustrating an embodiment of an information handling system.

Referring now to FIG. 2, an IHS 200 that may be the IHS 100, described above with reference to FIG. 1, and/or that may include some or all of the components of the IHS 100, is illustrated. A board 202 includes a system processor 205 that is mounted to the board 202. The system processor 205 may be, for example, the processor 102 described above with reference to FIG. 1. A plurality of memory devices 206 are coupled to the board 202. The memory devices 206 may be, for example, the system memory 114 described above with reference to FIG. 1. In an embodiment, the system processor 205 is operable to provide a primary graphics processor for processing graphics for applications run on the IHS 200. For example, the primary graphics processor may provide an integrated graphics processing unit (iGPU) for the IHS 200 through operation of the system processor 205. One of skill in the art will recognize that a variety of IHS components other than the system processor 205 and the memory devices 206 may be coupled to the board 202 while remaining within the scope of the present disclosure.

The IHS 200 also includes a board 208 that includes a secondary graphics processor 210 that is mounted to the board 208. The secondary graphics processor 210 provides for the processing of graphics for applications run on the IHS 200. For example, the secondary graphics processor 210 may provide a discrete graphics processing unit (dGPU) for the IHS 200. A plurality of memory devices 212 are coupled to the board 208. As is illustrated, the board 202 is coupled to the board 208 through a coupling 214. One of skill in the art will recognize that a variety of IHS components other than the secondary graphics processor 210 and the memory devices 212 may be coupled to the board 208 while remaining within the scope of the present disclosure.

One of skill in the art will recognize that the IHS 200 employs a topology that is commonly known as "iGPU with secondary dGPU" or "Switchable Graphics". Such topologies can be provided using a number of physical implementations. For example, in a desktop IHS implementation, the board 202 may be a motherboard that includes a card connector (e.g., a Peripheral Component Interconnect (PCI) card connector, a PCI Express (PCIe) card connector, and/or a variety of other card connectors known in the art), and the board 208 may be part of a video card (e.g., a PCI video card, a PCIe video card, and/or a variety of other video cards known in the art). In such an implementation, the coupling 214 represents the coupling of the video card including the secondary graphics processor 210 to the card connector on the motherboard. In another example, in a notebook or other portable IHS implementation, the board 202 may be a motherboard that includes the primary graphics processor 205 (e.g., the system processor that provides the primary graphics processor 205) and the secondary graphics processor 210 may be mounted to the motherboard in a manner similar to the mounting of the primary graphics processor 205 to the motherboard. In such an implementation, the coupling 214 represents a portion of the motherboard (e.g., the board 202) to which the secondary graphics processor 210 is mounted (i.e., the board 208 is part of the board 202). While specific implementations of "iGPU with secondary dGPU" or "Switchable Graphics" topologies have been described, one of skill in the art will recognize that modifications to those topologies may be made, and a variety of other "iGPU with secondary dGPU" or "Switchable Graphics" topology implementations will fall within the scope of the present disclosure. For example, a desktop IHS implementation may include both the primary and secondary graphics processors mounted to the same motherboard. Furthermore, some of the illustrated components may be omitted in some implementation (e.g., the memory devices 212 may be omitted when both the primary and secondary graphics processors are mounted to the same motherboard, as both the primary and secondary graphics processors may be able to use the memory devices 206.)

Figure 3:
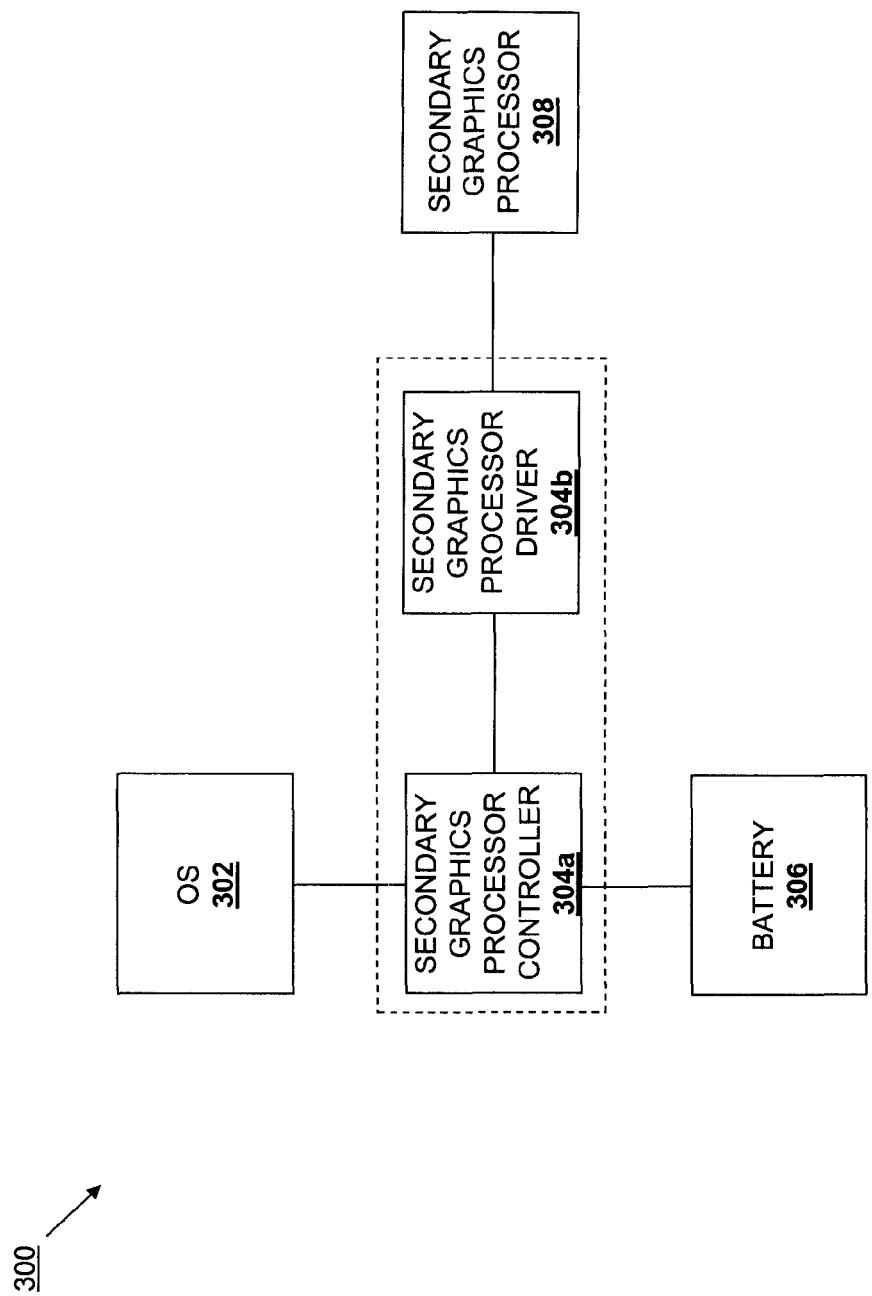
FIG. 3 is a schematic view illustrating an embodiment of a secondary graphics processor control system that may be used in the IHS of FIG. 2.

Referring now to FIG. 3, a secondary graphics processor control system 300 is illustrated. In an embodiment, the secondary graphics processor control system 300 may be implemented in the IHS 200, described above with reference to FIG. 2. The secondary graphics processor control system 300 includes an operating system 302 that may include instructions that are stored on a non-transitory, computer-readable medium (e.g., the storage device 108 and/or system memory 114 of FIG. 1) and that, when executed by a processor (e.g., the processor 102 of FIG. 1), provide an operating system for the IHS 200 as is known in the art. The operating system 302 is coupled to a secondary graphics processor controller 304a, which is coupled to a secondary graphics processor driver 304b. In an embodiment, the secondary graphics processor controller 304a and the secondary graphics processor driver 304b may be separate components. In another embodiment, the secondary graphics processor controller 304a and the secondary graphics processor driver 304b may be combined, as illustrated by the dotted line in FIG. 3 (e.g., in some embodiments, the secondary graphics processor controller 304a is provided by the secondary graphics processor driver 304b). The secondary graphics processor controller 304a is coupled to a battery 306 that may be used to provide power to the IHS 200. In an embodiment, the battery 306 may include a variety of battery components known in the art such as, for example, a battery management unit (BMU). In other embodiments, the battery 306 may be replaced by a variety of other power sources known in the art such as, for example, power sources external to the IHS 200. The secondary graphics processor driver 304b is coupled to a secondary graphics processor 308 which may be, for example, the secondary graphics processor 210 discussed above with reference to FIG. 2.

Figure 4:
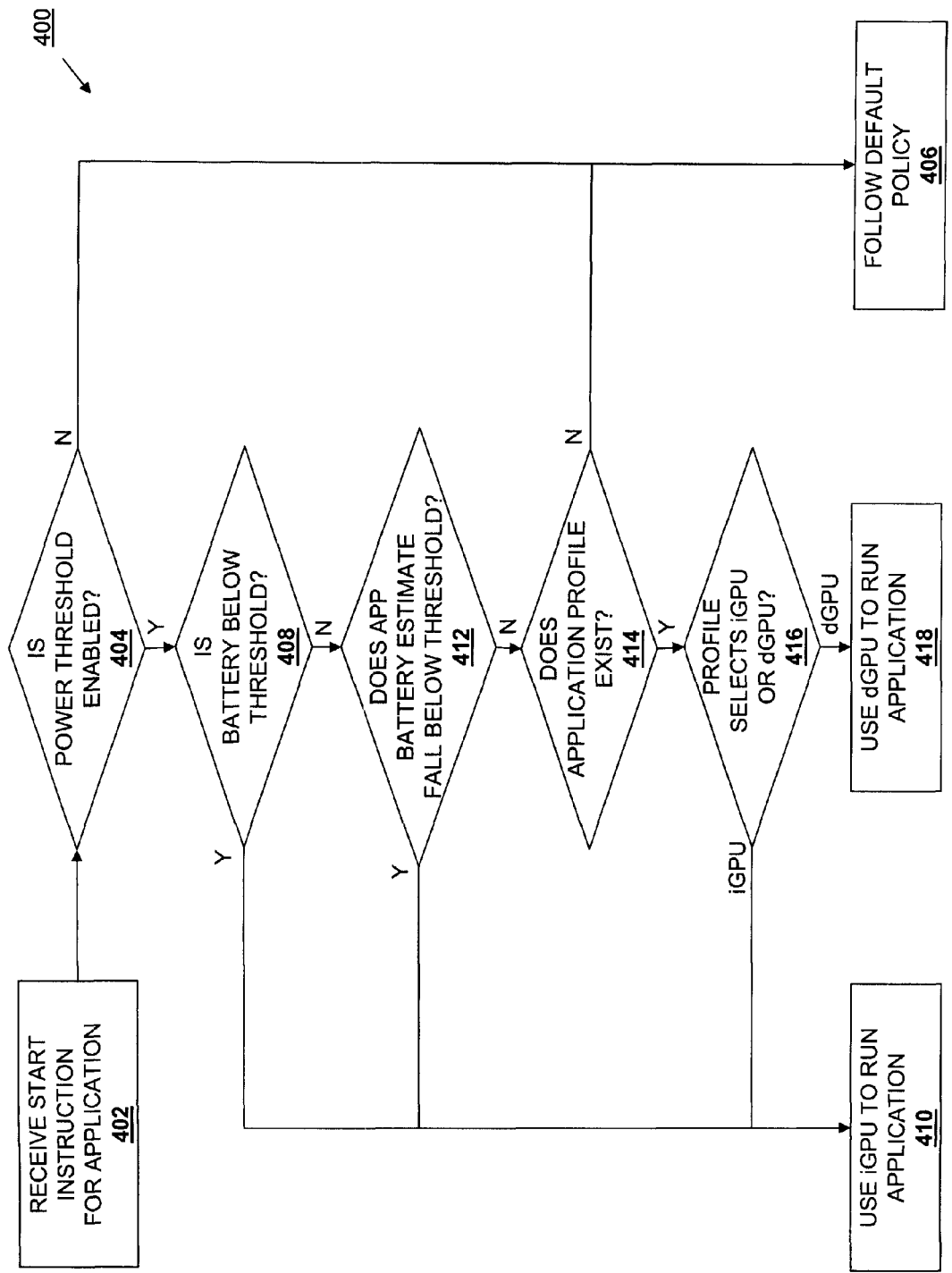
FIG. 4 is a flow chart illustrating a method for controlling a secondary graphics processor.

Referring now to FIGS. 3 and 4, a method 400 for controlling a secondary graphics processor is illustrated. In an embodiment, the method 400 may be performed on a portable IHS (e.g., a laptop or notebook IHS) running on battery power, and/or a variety of other limited power situations known in the art. In the embodiment described below, the primary graphics processor may be referred to as an iGPU, discussed above, and the secondary graphics processor may be referred to as a dGPU, also discussed above. However, one of skill in the art will recognize that the use of such naming conventions to describe the method 400 should not limit the applicability of the method 400 to processors that perform similar operations without sharing such naming conventions.

The method 100 begins at block 402 where a start instruction for an application is received. As is known in the art, a user of the IHS 200 may use the IHS 200 to send a start instruction for an application (e.g., by launching the application using the operating system 302 using methods known in the art). In response to the user sending the start instruction for the application, the operating system 302 will instruct the secondary graphics processor controller 304a to start the application.

The method 100 then proceeds to decision block 404 where the secondary graphics processor controller 304a determines whether a power threshold is enabled. In an embodiment, the secondary graphics processor controller 304a may store a power threshold that is used to determine whether to enable the secondary graphics processor 308 for processing graphics during the method 400, as is discussed in further detail below. In an embodiment, the secondary graphics processor controller 304a may be pre-programmed with the power threshold. In another embodiment, the secondary graphics processor controller 304a may allow a user of the IHS 200 to set or select the power threshold. For example, the user of the IHS 200 may enable, adjust, and/or otherwise select and/or provide a value for the power threshold using a control panel provided by the IHS 200. In an embodiment, the power threshold may include one or more power variables such as a power capacity threshold (e.g., a value that represents a remaining power capacity of the battery such as a percentage of power left in the battery), a time capacity threshold (e.g., a value that represents a remaining time capacity of the battery such as a time period remaining in which the battery may effectively power the IHS 200), and/or a variety of other power capacity thresholds known in the art. In an embodiment, the power threshold may include one or more application power thresholds such as an application battery estimate threshold (e.g., a value that represents how much power the battery will need for a typical use of the application) and/or a variety of other application power variables known in the art. At decision block 404, if the secondary graphics processor controller 304a determines that the power threshold has not been enabled, the method 400 proceeds to block 406 where a default policy for the application is followed. In an embodiment, the default policy includes instructions and/or other details for how the IHS should process instructions from the application.

If, at decision block 404, the secondary graphics processor controller 304a determines that the power threshold has been enabled, the method 400 proceeds to decision block 408 where the secondary graphics processor controller 304a determines whether the battery 306 is below the power threshold that was determined to be enabled at block 404 of the method 400. In an embodiment, the secondary graphics processor controller 304a may communicate with a BMU in the battery 306 to determine whether a power capacity of the battery 306 is below the power threshold. For example, at decision block 408, the BMU in the battery 306 may be able to provide the secondary graphics processor controller 304a with a value that represents a remaining power capacity of the battery such as a percentage of power left in the battery. In another example, at decision block 408, the BMU in the battery 306 may be able to provide the secondary graphics processor controller 304a with a value that represents a remaining time capacity of the battery such as a time period remaining in which the battery may effectively power the IHS 200. While the secondary graphics processor controller 304a has been described as communicating with the BMU in the battery 306 to determine whether the power capacity of the battery 306 is below the power threshold, one of skill in the art will recognize that a variety of techniques to discover a power capacity of the battery 306 will fall within the scope of the present disclosure.

If, at decision block 408, the secondary graphics processor controller 304a determines that power capacity of the battery 306 is below the power threshold, the method 400 proceeds to block 410 where the secondary graphics processor controller 304a prevents the secondary graphics processor driver 304b from enabling the secondary graphics processor 308 (e.g., the dGPU) such that the primary graphics processor (e.g., the iGPU) is used to run the application for which the start instruction was recieved at block 402 of the method 400. As discussed above, the secondary graphics processor driver 304b may include a list of application profiles that, upon receiving an instruction to start up of one of the applications associated with an application profile on that list, will conventionally cause the secondary graphics processor driver 304b to enable the secondary graphics processor 308 (e.g., the dGPU) for processing graphics for that application. For example, if the application for which the start instruction was received at block 402 of the method 400 is associated with an application profile on the list in the secondary graphics processor driver 304b, the secondary processor driver 304b would conventionally power up the dGPU, launch the application using the dGPU, and keep the dGPU active until the application was ended. However, at decision block 408 and block 410 of the method 400, the secondary graphics processor controller 304a will prevent enablement of the secondary graphics processor 308 such that the primary graphics processor (e.g., the iGPU) processes graphics for the application. For example, the iGPU may be processing graphics for any applications running on the IHS 200, and at blocks 402, 404, 408, and 410 of the method 400, an application that would normally have its graphics processed by the dGPU will instead have its graphics processed only by the iGPU due to the power capability of the battery 306 being below the power threshold.

If, at decision block 408, the secondary graphics processor controller 304a determines that the power capability of the battery 306 is not below the power threshold, the method 400 proceeds to decision block 412 where the secondary graphics processor controller 304a determines whether an application battery estimate falls below the power threshold. In an embodiment, the secondary graphics processor controller 304a is operable to determine an application battery estimate that includes an estimate of how much power a typical use of the application will consume when graphics for that application are processed by the secondary graphics processor 308. For example, the application battery estimate may be determined by averaging the power consumption of the application over a plurality of previous uses of the application when the graphics for that application were processed by the dGPU. In another example, the application battery estimate may be provided by the application provider. While a few examples have been provided, one of skill in the art will recognize that a variety of techniques may be used to determine an application battery estimate for an application. At decision block 412, the secondary graphics processor controller 304a retrieves the application battery estimate. In an embodiment, the secondary graphics processor controller 304a may use the battery power capacity determined in decision block 408 along with the application battery estimate to determine whether the battery 306 currently has enough power to run the application for a typical use with the secondary graphics processor 308 processing the graphics for the application.

If, at decision block 412, the secondary graphics processor controller 304a determines that the application battery estimate is below the power threshold (e.g., the application battery estimate threshold), the method 400 proceeds to block 410 and operates substantially as described above. Therefore, even if the battery 306 is determined to be above the power threshold at decision block 408 in the method 400, the secondary graphics processor controller 304a may determine that the application for which the start instruction was received at block 402 of the method 400 typically consumes more power than the battery 306 currently holds and, in response, the secondary graphics processor controller 304a will prevent enablement of the secondary graphics processor such that the primary graphics processor (e.g., the iGPU) is used to process graphics for the application. Thus, if the application for which the start instruction was received at block 402 of the method 400 includes an application profile on the list in the secondary graphics processor driver 304b, the secondary processor driver 304b would conventionally power up the dGPU, launch the application using the dGPU, and keep the dGPU active until the application was ended. However, at decision blocks 408 and 412 and block 410 of the method 400, the secondary graphics processor controller 304a will prevent enablement of the secondary graphics processor 308 such that the primary graphics processor (e.g., the iGPU) processes graphics for the application in response to the power capacity of the battery being above the power threshold but too low for a typical use of the application. For example, the iGPU may be processing graphics for applications running on the IHS 200, and at blocks 402, 404, 408, 412, and 410 of the method 400, an application that would normally have its graphics processed by the dGPU will instead have its graphics processed only by the iGPU due to the power capability of the battery 306 being above a power threshold but still insufficient to run the application.

If, at decision block 412, the secondary graphics processor controller 304a determines that the application battery estimate is above the power threshold, the method 400 then proceeds to decision block 414 where the secondary graphics processor controller 304a determines whether an application profile exists for the application for which a start instruction was received in block 402 of the method 400. As discussed above, the secondary graphics processor driver 304b includes a list of application profiles which, upon receiving an instruction to start up of one of the applications associated with an application profile on that list, will conventionally cause the secondary graphics processor driver 304b to enable the secondary graphics processor 308 (e.g., the dGPU) for processing graphics for the application. At decision block 414, the secondary graphics processor controller 304a determines whether the application for which the start instruction was received in block 402 of the method 400 is associated with an application profile on the list in the secondary graphics processor driver 304b. If, at decision block 414, the secondary graphics processor controller 304a determines that the application for which the start instruction was received in block 402 is not associated with an application profile in the list in the secondary graphics processor driver 304b, the method 400 proceeds to block 406 where the default policy for the application is followed, discussed above.

If, at decision block 414, the secondary graphics processor controller 304a determines that the application for which the start instruction was received in block 402 is associated with an application profile in the list in the secondary graphics processor driver 304b, the method 400 proceeds to decision block 416 the secondary graphics processor controller 304a determines whether the application profile includes instructions to use the primary graphics processor (e.g., the iGPU) to process graphics for the application or the secondary graphics processor (e.g., the dGPU) to process graphics for the application. If, at decision block 416, the secondary graphics processor controller 304a determines that the application profile includes instructions to use the primary graphics processor to process graphics, the method 400 proceeds to block 410. Thus, in an embodiment, if the battery 306 and the application battery estimate are not below the power threshold, an application profile for the application exists, and the application profile includes instructions to use the primary graphics processor to process graphics, the primary graphics processor will be used to process graphics for the application. An example of this embodiment includes the start of an application that is not relatively graphics intensive, followed by the iGPU, which is currently processing graphics for other applications running on the IHS 200, processing the graphics for the just-started application.

If, at decision block 416, the secondary graphics processor controller 304a determines that the application profile includes instructions to use the secondary graphics processor to process graphics, the method 400 proceeds to block 418 where the secondary graphics processor 308 is used to process the graphics for the application. At block 418, the secondary processor driver 304b enables the secondary graphics processor 308 for processing graphics for the application. Thus, in an embodiment, if the battery 306 and the application battery estimate are not below the power threshold, an application profile for the application exists, and the application profile includes instructions to use the secondary graphics processor to process graphics, the secondary graphics processor will be used to process graphics for the application. An example of this embodiment includes the start of an application that is relatively graphics intensive, and the method 400 results the secondary graphics processor controller 304a powering up the dGPU, launching the application using the dGPU, and keeping the dGPU active to process graphics for the application until the application ends.

In some embodiments, the iGPU performs all of the graphics processing for the IHS unless the method 400 reaches block 418. In some embodiments, at block 418 of the method 400, the dGPU performs all of the graphics processing for the application for which the start up instruction was received in block 402 of the method 400. In other embodiments, at block 418 of the method 400, the dGPU performs the heavy rendering of graphics processed for the application for which the start up instruction was received in block 402 of the method 400, and the iGPU may perform minor graphics processing operations. One of skill in the are will recognize that the dGPU will typically consume much more power than the iGPU, and limiting the use of the dGPU to situations where there is sufficient power for the IHS to consume will provide IHS users with a better experience.

Thus, a system and method for controlling a secondary graphics processor has been provided that only enables a secondary graphics processor to process graphics for an application, which would otherwise have its graphics processed by the secondary graphics processor, if a battery that supplies power to the system includes a power capability that is above a predetermined threshold. If the power capability of the battery is below the predetermined threshold, a primary graphics processor will process graphics for the application. In an IHS with an "iGPU with secondary dGPU" or "Switchable Graphics" topology, this results in the iGPU processing graphics for any application that is run on the IHS unless the application is both associated with an application profile that instructs use of the dGPU for processing graphics for the application and the battery in the IHS has threshold power capability such that the dGPU will run the application without an undesirable depletion of the batter. Such systems and methods override conventional graphics processor switching algorithms such that the IHS may conserve power, which is particularly beneficial in a limited power situation such as when the IHS is using battery power.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A secondary graphics processor control system, comprising:
   a secondary graphics processor; and
   a controller coupled to the secondary graphics processor, wherein the controller is configured to:
      detect a start of an application that is associated with graphics processing by the secondary graphics processor;
      determine a power capability of a battery in direct response to detecting the start of the application;
      in response to the power capability of the battery being below a predetermined threshold, prevent enablement of the secondary graphics processor for processing graphics for the application; and
      in response to the power capability of the battery being above the predetermined threshold:
         determine an application battery estimate that includes an average power consumption of the application over a plurality of previous uses of the application when graphics for the application are processed using the secondary graphics processor;
         allow enablement of the secondary graphics processor for processing graphics for the application until the application is ended in response to the application battery estimate being below the power capability of the battery; and
         prevent enablement of the secondary graphics processor for processing graphics for the application in response to the application battery estimate being above the power capability of the battery.

2. The system of claim 1, wherein the controller includes a secondary graphics processor driver.

3. The system of claim 1, further comprising:
   a battery coupled to the controller and configured to provide the power capability to the controller.

4. The system of claim 1, further comprising:
   a primary graphics processor mounted on a board, wherein the secondary graphics processor is coupled to the board.

5. The system of claim 4, wherein the primary graphics processor is an integrated graphics processing unit (iGPU) provided by a system processor that is mounted to the board, and wherein the secondary graphics processor is a discrete graphics processing unit (dGPU) that is coupled to the board.

6. The system of claim 1, wherein the determining the power capability of the battery includes determining a remaining power capacity of the battery.

7. The system of claim 1, wherein the determining the power capability of the battery includes determining a remaining time capacity of the battery.

8. An information handling system (IHS), comprising:
   a chassis;
   a board housed in the chassis;
   a battery coupled to the board;
   a primary graphics processor mounted to the board;
   a secondary graphics processor coupled to the board; and
   a controller coupled to the secondary graphics processor, wherein the controller is configured to:
   detect a start of an application that is associated with graphics processing by the secondary graphics processor and, in direct response, determine a power capability of the battery;
   prevent enablement of the secondary graphics processor in response to the power capability being below a predetermined threshold, wherein the preventing results in only the primary graphics processor processing graphics for the application;
   prevent enablement of the secondary graphics processor in response to the power capability being above the predetermined threshold and an application battery estimate being above the power capability of the battery, wherein the application battery estimate includes an average power consumption of the application over a plurality of previous uses of the application when graphics for the application are processed using the secondary graphics processor, and wherein the preventing results in only the primary graphics processor processing graphics for the application; and
   allow enablement of the secondary graphics processor in response to the power capability being above the predetermined threshold and the application battery estimate being below the power capability of the battery, wherein the allowing results in the secondary graphics processor processing graphics for the application until the application is ended.

9. The IHS of claim 8, wherein the controller includes a secondary graphics processor driver.

10. The IHS of claim 8, wherein the primary graphics processor is an integrated graphics processing unit (iGPU) provided by an IHS processor that is mounted to the board, and wherein the secondary graphics processor is a discrete graphics processing unit (dGPU) that is coupled to the board.

11. The IHS of claim 8, wherein the determining the power capability of the battery includes determining a remaining power capacity of the battery.

12. The IHS of claim 8, wherein the determining the power capability of the battery includes determining a remaining time capacity of the battery.

13. A method for controlling a secondary graphics processor, comprising:
   detecting a start of an application that is associated with graphics processing by a secondary graphics processor;
   determining a power capability of a battery that is coupled to the secondary graphics processor in direct response to detecting the start of the application;
   preventing enablement of the secondary graphics processor in response to the power capability being below a predetermined threshold, wherein the preventing results in only a primary graphics processor processing graphics for the application;
   retrieving an application battery estimate that includes an average power consumption of the application over a plurality of previous uses of the application when graphics for the application are processed using the secondary graphics processor;
   allowing enablement of the secondary graphics processor in response to the power capability being above the predetermined threshold and the application battery estimate being below the power capability of the battery, wherein the allowing results in the secondary graphics processor processing graphics for the application until the application is ended;
   preventing enablement of the secondary graphics processor in response to the power capability being above the predetermined threshold and the application battery estimate being above the power capability of the battery, wherein the preventing results in only a primary graphics processor processing graphics for the application.

14. The method of claim 13, wherein the primary graphics processor is an integrated graphics processing unit (iGPU) provided by a system processor that is mounted to a board, and wherein the secondary graphics processor is a discrete graphics processing unit (dGPU) that is coupled to the board.

15. The method of claim 13, wherein the determining the power capability of the battery includes determining a remaining power capacity of the battery.

16. The method of claim 13, wherein the determining the power capability of the battery includes determining a remaining time capacity of the battery.

17. The method of claim 13, wherein the enablement of the secondary graphics processor has been allowed in response to the power capability being above the predetermined threshold, and the method further comprises:

detecting the end of the application and, in direct response, disabling the secondary graphics processor such that only the primary graphics processor processes graphics.

* * * * *